(12) United States Patent
Shemesh

(10) Patent No.: US 9,485,009 B1
(45) Date of Patent: Nov. 1, 2016

(54) ANTENNA SYSTEM WITH HIGH DYNAMIC RANGE AMPLIFIER FOR RECEIVE ANTENNA ELEMENTS

(71) Applicant: Panasonic Avionics Corporation, Lake Forest, CA (US)

(72) Inventor: Yair Shemesh, Haifa (IL)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

(21) Appl. No.: 15/098,048

(22) Filed: Apr. 13, 2016

(51) Int. Cl.
| H04B 7/15 | (2006.01) |
| H04B 7/185 | (2006.01) |
| H04B 1/50 | (2006.01) |
| H04L 1/00 | (2006.01) |
| H04B 7/155 | (2006.01) |

(52) U.S. Cl.
CPC ............ *H04B 7/18508* (2013.01); *H04B 1/50* (2013.01); *H04B 7/15535* (2013.01); *H04L 1/0071* (2013.01)

(58) Field of Classification Search
CPC .......................... H04B 7/15535; H04B 7/2609
USPC ........... 455/66.1, 67.11, 562.1, 277.1, 276.1, 455/279.1
See application file for complete search history.

(56) References Cited

U.S. PATENT DOCUMENTS

| 6,362,793 B1 * | 3/2002 | Sawamura ............ H01Q 1/243 343/702 |
| 7,595,762 B2 | 9/2009 | Mansour |
| 7,629,935 B2 | 12/2009 | Mansour et al. |
| 7,633,435 B2 | 12/2009 | Meharry et al. |
| 7,663,566 B2 | 2/2010 | Engel |
| 7,768,469 B2 | 8/2010 | Mansour et al. |
| 7,821,355 B2 | 10/2010 | Engel |
| 7,994,998 B2 | 8/2011 | Engel |
| 7,999,750 B2 | 8/2011 | Mansour et al. |
| 8,185,045 B2 | 5/2012 | Mansour |
| 8,964,891 B2 | 2/2015 | Tsofe |
| 2002/0045431 A1 * | 4/2002 | Bongfeldt .......... H04B 7/15535 455/234.1 |
| 2015/0092622 A1 | 4/2015 | Sturkovich et al. |

* cited by examiner

*Primary Examiner* — John J Lee
(74) *Attorney, Agent, or Firm* — Klein, O'Neill & Singh, LLP

(57) ABSTRACT

An antenna system is provided. The antenna system includes a planar array of antenna elements configured to operate as an array having a plurality of receive (Rx) antenna elements for receiving a signal in a first frequency band and a plurality of transmit (Tx) antenna elements for transmitting a signal in a second frequency band. The Rx antenna elements and the Tx antenna elements are interleaved in a pattern such that total Tx power leakage is distributed among the plurality of Rx antenna elements. Furthermore, each Rx antenna element is provided with a high dynamic range amplifier (HDRA) for amplifying a receive signal and filtering any Tx power leakage at each Rx antenna element.

20 Claims, 3 Drawing Sheets

ANTENNA SYSTEM WITH HIGH DYNAMIC RANGE AMPLIFIER FOR RECEIVE ANTENNA ELEMENTS

CROSS-REFERENCE TO RELATED APPLICATIONS

Not Applicable.

STATEMENT RE: FEDERALLY SPONSORED RESEARCH

Not Applicable.

TECHNICAL FIELD

The present disclosure relates to antennas for satellite communication, and more particularly to antenna assemblies including an array of antenna elements configured to operate as an array.

BACKGROUND

An array of antennas maybe used on vehicles, especially aircraft, for receiving signals from other sources, for example, satellites and transmitting signals to satellites. Conventional antenna systems typically use a diplexer to isolate receive and transmit signals that have different frequencies. The diplexer however can be large in size, expensive and introduce signal losses. Other solutions may use a circulator that is also bulky and expensive. Thus, conventional solutions using diplexers and/or circulators may not be desirable on vehicles like, an aircraft, where space and weight constraints are significant design parameters. Continuous efforts are being made for efficient antenna systems that can be easily used on vehicles in general and aircrafts in particular.

SUMMARY

In one aspect, an antenna system is provided. The antenna system includes a planar array of antenna elements configured to operate as an array having a plurality of receive (Rx) antenna elements for receiving a signal in a first frequency band and a plurality of transmit (Tx) antenna elements for transmitting a signal in a second frequency band. The Rx antenna elements and the Tx antenna elements are interleaved in a pattern such that total Tx power leakage is distributed among the plurality of Rx antenna elements. Furthermore, each Rx antenna element is provided with a high dynamic range amplifier (HDRA) for amplifying a receive signal and filtering any Tx power leakage at each of the Rx antenna element.

Other aspects and advantages will become apparent from the following description, taken in conjunction with the accompanying drawings.

BRIEF DESCRIPTION OF THE DRAWINGS

The various features of the present disclosure will now be described with reference to the drawings of the various aspects disclosed herein. In the drawings, the same components may have the same reference numerals. Note that the drawings are not intended to be to scale or show actual quantities of components, dimensions, or relative sizes. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related and/or information processing entity, either software-executing general or special purpose processor, hardware, firmware and/or a combination thereof. For example, a component may be, but is not limited to being, a process running on a hardware processor, a hardware processor, an object, an executable, a thread of execution, a program, and/or a computer. For example, a controller or control system may be implemented in software, hardware, and/or a combination thereof.

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), solid state memory device or any other storage device, in accordance with the claimed subject matter.

In one aspect, the following disclosure provides an antenna system intended for use on vehicles, for example, aircrafts, trains and others. The antenna system includes a planar array of antenna elements configured to operate as an array having a plurality of receive (Rx) antenna elements for receiving a signal at a first frequency band and a plurality of transmit (Tx) antenna elements for transmitting a signal at a second frequency band. The Rx antenna elements and the Tx antenna elements are interleaved in a pattern such that total Tx power leakage is distributed among the plurality of Rx antenna elements. Furthermore, each Rx antenna element is provided with a high dynamic range amplifier (HDRA) for amplifying a receive signal and filtering any Tx power leakage at each of the Rx antenna element.

Figure 1:
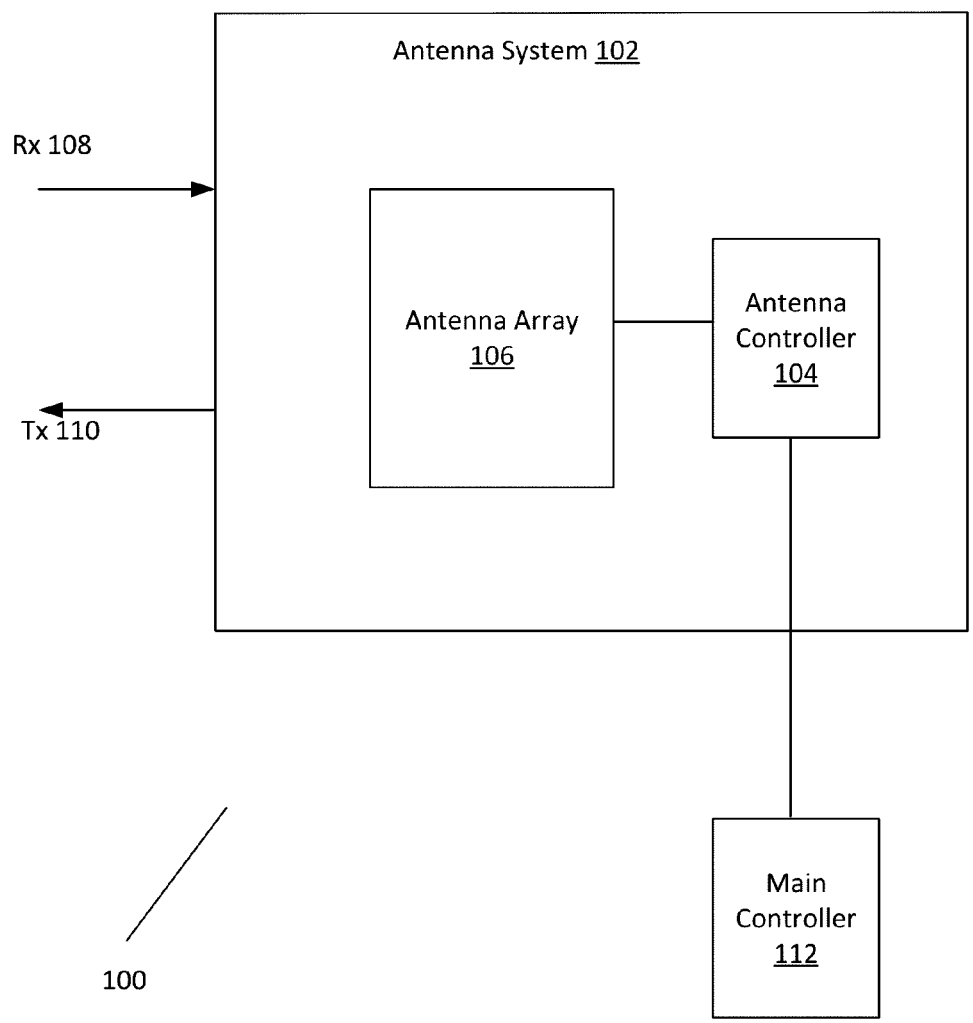
FIG. 1 is a block diagram of an antenna system, according to one aspect of the present disclosure.

FIG. 1 shows an example of a system 100 with an antenna system 102 for receiving a signal 108 from a satellite in a first frequency band and transmitting a signal 110 to the satellite in a second frequency band, according to one aspect of the present disclosure. In one aspect, the antenna system 102 maybe sized and shaped to fit within the space specified by the "ARINC 791" standard that defines the Ku and Ka band satellite data airborne terminal equipment, at least for wide-body aircraft. As an example, the antenna system 102 may be configured for placement at the tail of an aircraft. The various aspects disclosed herein are not limited to any specific area of placement for the antenna system 102. Furthermore, the antenna system 102 may have other generic components, for example, a pilot generator, pilot detector and other components, such as phase shifters for operating the antenna system as a phased array. These generic components have not been described for brevity, as they may not be germane to the various adaptive aspects described herein.

For communication with geostationary satellites in the Ku and/or Ka band and providing a satisfactory communication experience for passengers on wide-body aircraft and smaller, a certain G/T is provided by the antenna system 102, for example, a 9 db/K. G/T is a factor typically used for characterizing antenna performance, where G is the antenna gain in decibels in a receive frequency band, and T is the equivalent noise temperature in Kelvins. For example, the antenna system 102 may be configured to provide a G/T that may be 10 db/K-10.5 db/K for circular polarizations at lower elevations scans, e.g., from 10 up to 30 degrees. For higher elevations scans, e.g., from at least 30 degrees to 90 degrees, G/T may be between 11 db/K to 12.5 db/K. The G/T values are simply provided as examples and are not to be construed as limiting the various adaptive aspects described herein.

With respect power usage, the antenna system 102 is efficient and may be configured to use optimum power for an aircraft, for example, less than 300 watts. Most of the power maybe used for transmission, nominally around 60 to 65% of the power consumed.

The antenna system 102 includes an antenna controller 104 that may be implemented as one or more integrated circuit with various components for managing both receive and transmit signals that maybe at different frequencies.

The antenna system 102 may interface with a main controller 112 of the vehicle. In one aspect, the antenna system 102 may communicate with the main controller 112 by a network connection or maybe directly attached using another interconnect type. The main controller 112 may include a DC power distribution network based on an AC/DC power supply from the vehicle (typically 48 VDC for an aircraft), an on-board modem, and an antenna positioning system which can provide full data (GPS location and vehicle positioning) for satellite tracking. The main controller 112 is responsible for overall control of the antenna assembly 102, line of sight calculations, built-in testing and test equipment (BIT/BITE) management, and communication with external controllers (not shown), such as a broadband controller including a modem, in the vehicle and specific antenna controllers. The broadband controller provides L-band signals for transmission and the antenna assembly 102 provides the broadband controller with received signals in the L-band.

In one aspect, the antenna system 102 includes an array 106 of antenna elements that are disposed on an antenna tile of a plurality of antenna tiles. The antenna elements are configured to operate as an array. The antenna tiles maybe substantially the same size for reduced manufacturing and replacement costs, i.e., each tile may have substantially the same dimensions. For an antenna system intended for a wide-body aircraft, and using square tiles, a tile size may range from 50 mm×50 mm to 200 mm×200 m, for example, 100 mm×100 mm. The thickness of each tile may not be more than 30 mm in thickness, for example, between 15 mm to 20 mm in thickness. Thinner tiles maybe used for lighter weight and lower profiles of the antenna assembly for reduced drag. The adaptive aspects disclosed herein are not limited to any particular tile size.

Figure 2:
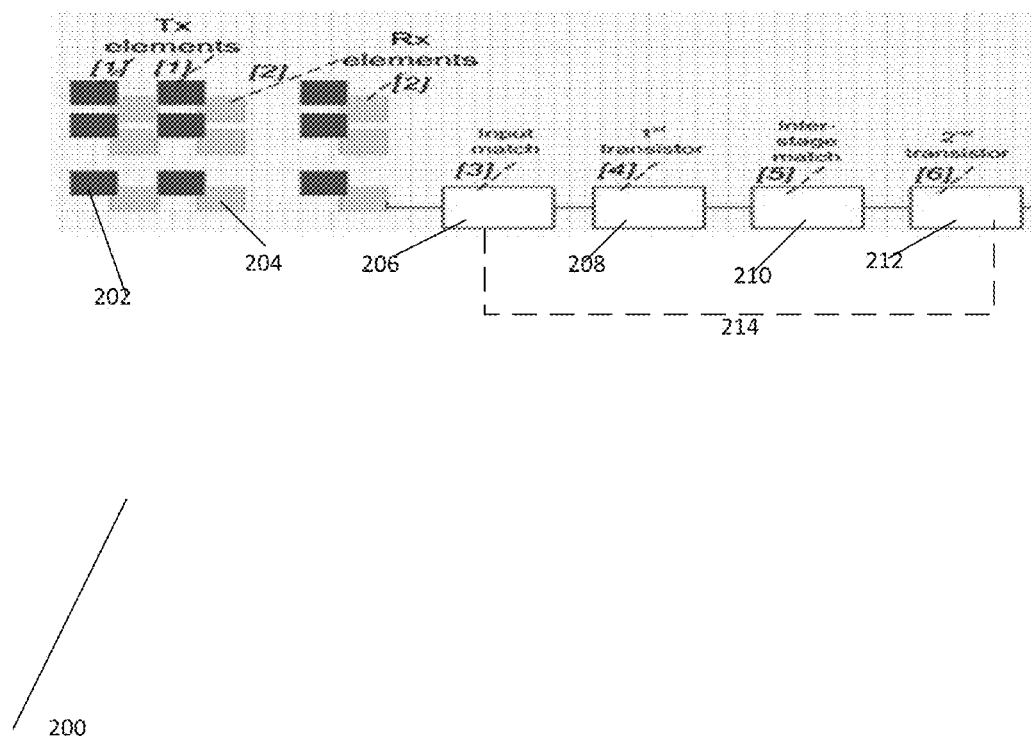
FIG. 2 shows an example of a schematic of interleaved receive (Rx) and transmit (Tx) antenna elements of the antenna system of FIG. 1, according to one aspect of the present disclosure.

In one aspect, the antenna elements of array 106 have interleaved transmit (Tx) and receive (Rx) antenna elements as shown in FIG. 2. For example, the array 106 includes a plurality of Tx elements 202 and Rx elements 204. Each antenna element 202 and 204 operates as a radiating element cell, i.e., the smallest building block or component of an antenna array. The antenna elements may be dual edge-fed, pin-fed, EM-coupled or other patch type configured to operate as an array as is known in the art.

In one aspect, the antenna elements are substantially identical to one another in shape and maybe a rectangle, a square, a polygon, a parallelogram, a square or a hexagon. Other shapes may be used as well, such as circles, triangles, rectangles, etc. In general, shapes are preferred that can be place together without overlapping or leaving gaps between the elements. The antenna elements 202 and 204 maybe the same size for further reduced manufacturing and replacement costs.

In one aspect, a transmit signal is transmitted over the plurality of Tx elements 202. Each of the plurality of Rx elements 204 that are interspersed between the Tx elements only absorb a fraction of the overall Tx signal power.

In one aspect, instead of using a heavy and expensive diplexers and/or circulators, like unwieldy conventional systems, each Rx element 204 is provided with a high dynamic range amplifier (HDRA) 214 that is configured to filter out the Tx frequency signal without degrading the Rx noise figure (NF) or distorting the Rx frequency signal. The term noise figure as known in the art is a measure of signal degradation in a radio frequency signal chain measured in decibels.

In one aspect, HDRA 214 includes an impedance matching element (shown as "input match") 206, a first transistor 208, an inter-stage match element 210 and a second transistor 212. The input match 206 performs a first level impedance matching to reject at least a portion of the Tx signal that leaks into the Rx antenna element without increasing Rx band loss. Thus the Tx signal entering the first stage transistor 208 will be lower than the initial Tx signal that leaks into the input match element 206.

In one aspect, the bias point of the first transistor 208 is set to the highest safe drain voltage i.e. the largest voltage when turned off will not cause a breakdown. For such a bias point, the compression point is higher, the gain may be slightly reduced but the noise level is similar to the NF at a nominal bias point, which enables higher allowed input power.

The inter-stage element 210 performs impedance matching and includes a band stop to substantially reject any portion of the Tx signal that may have leaked into the first transistor 208. The output from the inter-stage match element 210 is sent to the second transistor 212 that is also biased at a high bias point similar to transistor 208 to maintain low noise and high output power. The output of the second transistor 212 is also matched for power rather than gain.

In one aspect, the system of FIG. 2 has various advantages over conventional systems. For example, in conventional systems, a single Rx path has to handle the entire leakage of the Tx signal. This requires Tx sampling and complex cancellation schemes. In the system described above, Tx signal power that leaks into various Rx elements is distributed across multiple Rx paths involving multiple Rx elements of an active Rx array. Therefore, the Tx leakage level for each Rx element is much lower than the entire Tx power that has to be processed by a single Rx path of conventional systems. Furthermore, the HDRA for each Rx element as configured in FIG. 2 eliminates the need for heavy and expensive diplexers and circulators of conventional systems.

Figure 3:
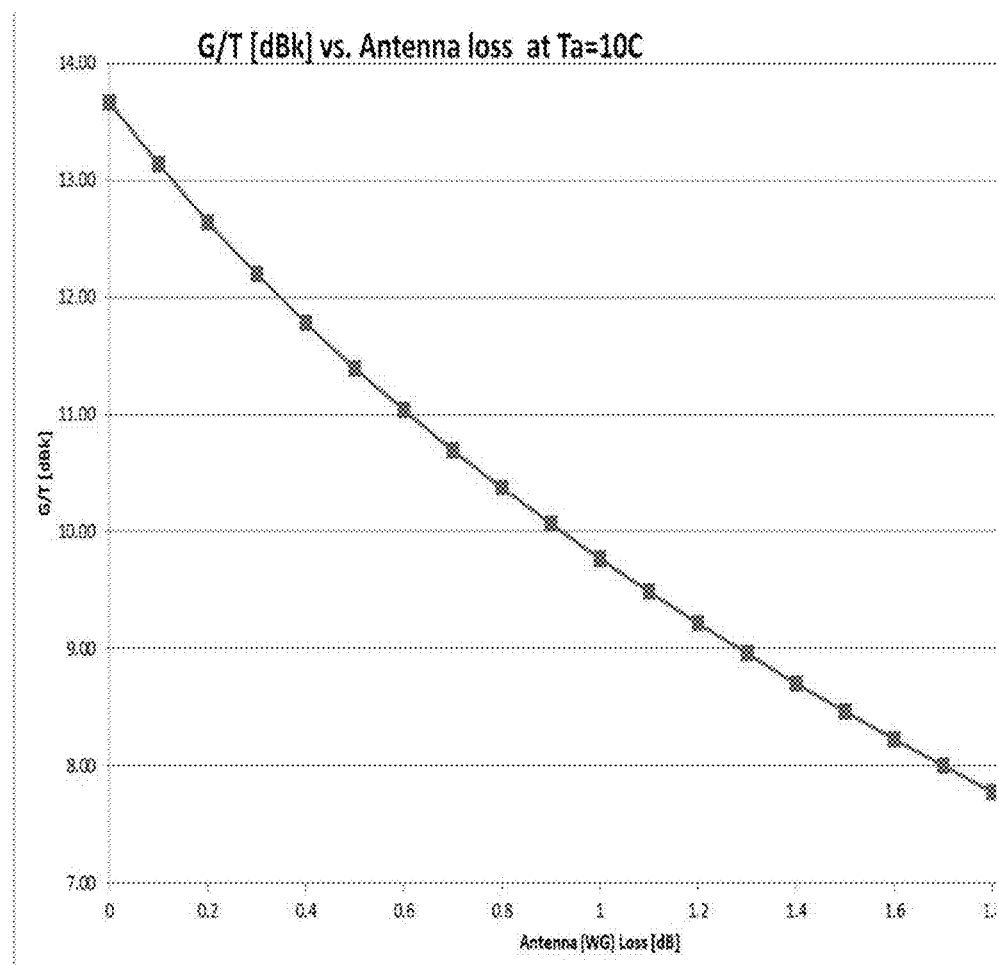
FIG. 3 shows graphical illustration of potential system improvement by using the antenna elements of FIG. 2, according to one aspect of the present disclosure.

FIG. 3 shows a graphical example 300 of G/T vs loss between Rx element and HDRA 214 using the antenna system 102. Graph 300 shows the impact of every 0.1 dB saving for a typical-1 dB loss.

Thus, an antenna system with interleaved receive and transmit antenna elements have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims. For example, the antenna assembly may be designed to operate in other bands from Ku and Ka, such as the C band for example. Different tile shapes could be provided, or a mixture of tile shapes provided, with different quantities of antenna elements.

What is claimed is:

1. An antenna system comprising:
a planar array of antenna elements that operate as an array and having a plurality of receive (Rx) antenna elements for receiving a signal in a first frequency band and a plurality of transmit (Tx) antenna elements for transmitting a signal in a second frequency band, wherein the Rx antenna elements and the Tx antenna elements are interleaved in a pattern such that total Tx power leakage is distributed among the plurality of Rx antenna elements; and wherein each Rx antenna element is provided with a high dynamic range amplifier (HDRA) for amplifying a receive signal and filtering any Tx power leakage at each of the Rx antenna element.

2. The antenna system of claim 1, wherein the HDRA includes an impedance matching module to partially reject a portion of the Tx power leakage at each of the Rx antenna element.

3. The antenna system of claim 2, wherein the HDRA includes a first transistor that receives an input from the impedance matching module and uses a highest safe drain voltage for output.

4. The antenna system of claim 3, wherein the HDRA includes an inter-stage matching module that receives an input from the first transistor, performs impedance matching and rejects any remaining Tx power leakage.

5. The antenna system of claim 4, wherein the HDRA includes a second transistor that receives an input from the inter-stage matching module and uses a highest safe drain voltage for output.

6. The antenna system of claim 1, wherein the antenna system is devoid of a diplexer and a circulator.

7. The antenna system of claim 1, wherein the antenna system is deployed on a transportation vehicle for satellite communication.

8. The antenna system of claim 7, wherein the transportation vehicle is an aircraft.

9. The antenna system of claim 8, wherein the antenna system is mounted at a tail of the aircraft.

10. An antenna system comprising:
a planar array of antenna elements that operate as an array and having a plurality of receive (Rx) antenna elements for receiving a signal in a first frequency band and a plurality of transmit (Tx) antenna elements for transmitting a signal in a second frequency band, wherein the Rx antenna elements and the Tx antenna elements are interleaved in a pattern such that total Tx power leakage is distributed among the plurality of Rx antenna elements; wherein each Rx antenna element is provided with a high dynamic range amplifier (HDRA) for amplifying a receive signal and filtering any Tx power leakage at each of the Rx antenna element; and wherein the HDRA includes an impedance matching module to partially reject a portion of the Tx power leakage at each of the Rx antenna element and a first transistor that receives an input from the impedance matching module and uses a highest safe drain voltage for output.

11. The antenna system of claim 10, wherein the HDRA includes an inter-stage matching module that receives an input from the first transistor, performs impedance matching and rejects any remaining Tx power leakage.

12. The antenna system of claim 11, wherein the HDRA includes a second transistor that receives an input from the inter-stage matching module and uses a highest safe drain voltage for output.

13. The antenna system of claim 10, wherein the antenna system does not use a diplexer or a circulator.

14. The antenna system of claim 10, wherein the antenna system is deployed on a transportation vehicle for satellite communication.

15. The antenna system of claim 14, wherein the transportation vehicle is an aircraft.

16. The antenna system of claim 15, wherein the antenna system is mounted at a tail of the aircraft.

17. An antenna system comprising:
a planar array of antenna elements that operate as an array and having a plurality of receive (Rx) antenna elements for receiving a signal in a first frequency band and a plurality of transmit (Tx) antenna elements for transmitting a signal in a second frequency band;
wherein the Rx antenna elements and the Tx antenna elements are interleaved in a pattern such that total Tx power leakage is distributed among the plurality of Rx antenna elements;
wherein each Rx antenna element is provided with a high dynamic range amplifier (HDRA) for amplifying a receive signal and filtering any Tx power leakage at each of the Rx antenna element; and
wherein the HDRA includes an impedance matching module to partially reject a portion of the Tx power leakage at each of the Rx antenna element; a first transistor that receives an input from the impedance matching module and uses a highest safe drain voltage for output; an inter-stage matching module that receives an input from the first transistor, performs impedance matching and rejects any remaining Tx power leakage; and a second transistor that receives an input from the inter-stage matching module and uses a highest safe drain voltage for output.

18. The antenna system of claim 17, wherein the antenna system does not use a diplexer or a circulator.

19. The antenna system of claim 17, wherein the antenna system is deployed on a transportation vehicle for satellite communication.

20. The antenna system of claim 19, wherein the transportation vehicle is an aircraft and the antenna system is mounted at a tail of the aircraft.

* * * * *